United States Patent [19]

Yasuda et al.

[11] Patent Number: 5,126,895
[45] Date of Patent: Jun. 30, 1992

[54] SHOCKPROOF DATA TRANSDUCER POSITION CONTROL SYSTEM FOR ROTATING DISK DATA STORAGE APPARATUS

[75] Inventors: Kazuhiko Yasuda, Fussa; Sumio Wada, Koga; Akira Shinohara, Sayama, all of Japan

[73] Assignee: TEAC Corporation, Tokyo, Japan

[21] Appl. No.: 521,670

[22] Filed: May 10, 1990

[30] Foreign Application Priority Data

May 11, 1989 [JP] Japan .................................. 1-117997

[51] Int. Cl.⁵ .................. G11B 5/596; G11B 19/04
[52] U.S. Cl. ................... 360/77.07; 360/60; 360/77.08; 369/44.33
[58] Field of Search ............ 360/60, 61, 46, 67, 360/68, 78.04, 77.02-77.11; 369/44.31, 44.33

[56] References Cited

U.S. PATENT DOCUMENTS

| | | |
|---|---|---|
| 4,390,912 | 6/1983 | Hertrich et al. |
| 4,554,652 | 11/1985 | Maeda et al. ............... 369/44.33 |
| 4,803,572 | 2/1989 | Haruna et al. ............... 360/60 |
| 4,819,153 | 4/1989 | Graham et al. ............... 360/77.04 |
| 4,839,751 | 6/1989 | Revels ............................. 360/60 |

*Primary Examiner*—Aristotelis Psitos
*Assistant Examiner*—Steven R. Garland
*Attorney, Agent, or Firm*—Woodcock Washburn Kurtz Mackiewicz & Norris

[57] ABSTRACT

A transducer position control system capable of shockproofing a hard disk data storage apparatus. Included is an off-track detector circuit relying on servo bursts prerecorded on the disk for detecting if the transducer is positioned within predetermined limits on any desired one of the concentric data tracks on the disk. If not, the off-track detector circuit signals a write circuit to inhibit writing. A programmed microcomputer may be employed to retry the writing of the same data on the disk sector where the transducer has gone off the track.

1 Claim, 3 Drawing Sheets

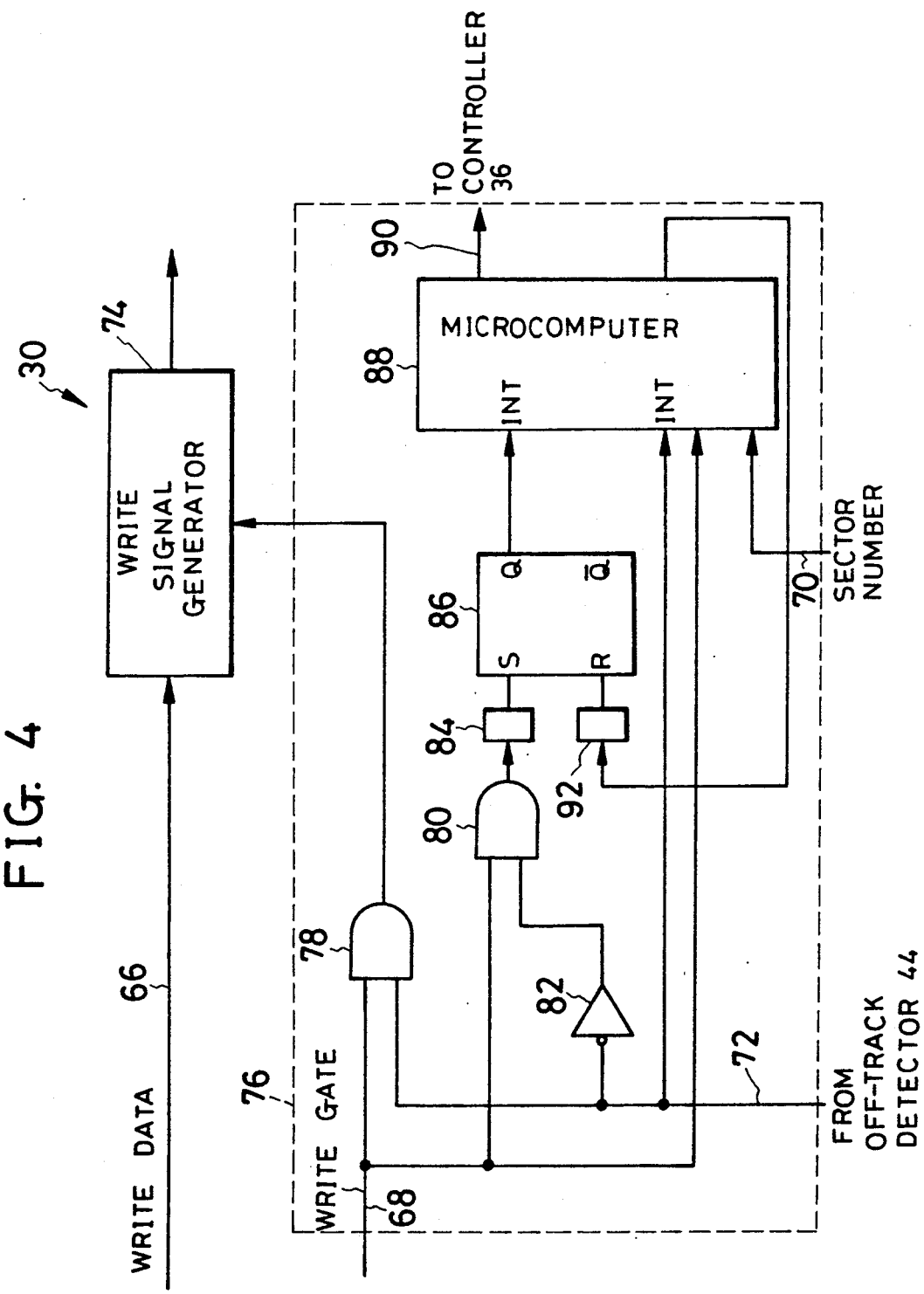

SHOCKPROOF DATA TRANSDUCER POSITION CONTROL SYSTEM FOR ROTATING DISK DATA STORAGE APPARATUS

BACKGROUND OF THE INVENTION

Our invention relates generally to an apparatus for the transfer (reading and/or writing) of data with disk-like record media such as magnetic disks notably including those of the "fixed" or hard disk variety. More particularly, our invention pertains to a positional control system for a data transducer or head in such an apparatus in accessing the transducer to any of a multiplicity of concentric data tracks on the rotating disk. The transducer position control system of our invention particularly features provisions for protection of the apparatus against shocks or vibrations that may be exerted thereon in use.

Hard disk drives in general employ some form of rotary or linear actuator under closed- or open-loop electronic control for positioning the transducer in centerline alignment with any of the data tracks on the disk. Hertrich et al. U.S. Pat. No. 4,390,912 teaches a servo positioning system incorporating a voice coil motor.

One of the problems that have been left unsolved in connection with such transducer positioning systems is how to position the transducer in the face of vibrations or shocks that may be applied to the disk drive in use. Transducer displacement due to such external forces has been particularly liable to occur if the positioning system employs a voice coil motor. Although generally preferred for its high response, the voice coil motor inherently lacks in the capability of holding the transducer against lateral displacement from any desired data track on the disk.

Let us suppose that the transducer is mechanically displaced from one track to another on which data has been written. The transducer has been allowed to overwrite, and so destroy, the data on the neighboring track in the prior art system of the type under consideration, if a write current is fed to the transducer before its lateral position is corrected under servo control. The user has been warned of this danger and advised not to subject the disk drive to shocks or vibrations. Hard disk drives have thus been intended for use in fixed locations only. Obviously, then, they will find their way into portable computer systems if protected against data error or destruction due to external shocks or vibrations.

SUMMARY OF THE INVENTION

We have hereby invented how to protect a rotating disk data storage apparatus of the type in question from external shocks or vibrations and hence to pave its way for use in portable computer systems.

Briefly, our invention may be summarized as a transducer position control system for a data storage apparatus having transducer means movable across a series of concentric data tracks on a disk medium for writing and reading data thereon, write circuit means for supplying to the transducer means a write signal representative of data to be written, and read circuit means for processing the data read by the transducer means from the disk medium.

Characteristically, the transducer position control system comprises off-track detector circuit means connected to the read circuit means for detecting whether or not the transducer means is positioned within predetermined limits on any desired one of the data tracks on the disk medium. Write control circuit means is connected between the offtrack detector circuit means and the write circuit means for preventing the latter from supplying the write signal to the transducer means when the transducer means is found displaced from the desired data track beyond the predetermined limits.

The transducer is thus automatically prevented from overwriting and destroying the data on tracks on either side of the track on which it must be positioned.

Our invention also features provisions for memorizing a disk sector where the transducer has gone off the track, and for commanding the rewriting of the same data on the required track. This retry feature is believed to further enhance the utility of the shockproof data storage apparatus.

The above and other features and advantages of our invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 4 is a block diagram of the write circuit in the system of FIG. 1.

DESCRIPTION OF THE PREFERRED EMBODIMENT

Figure 1:
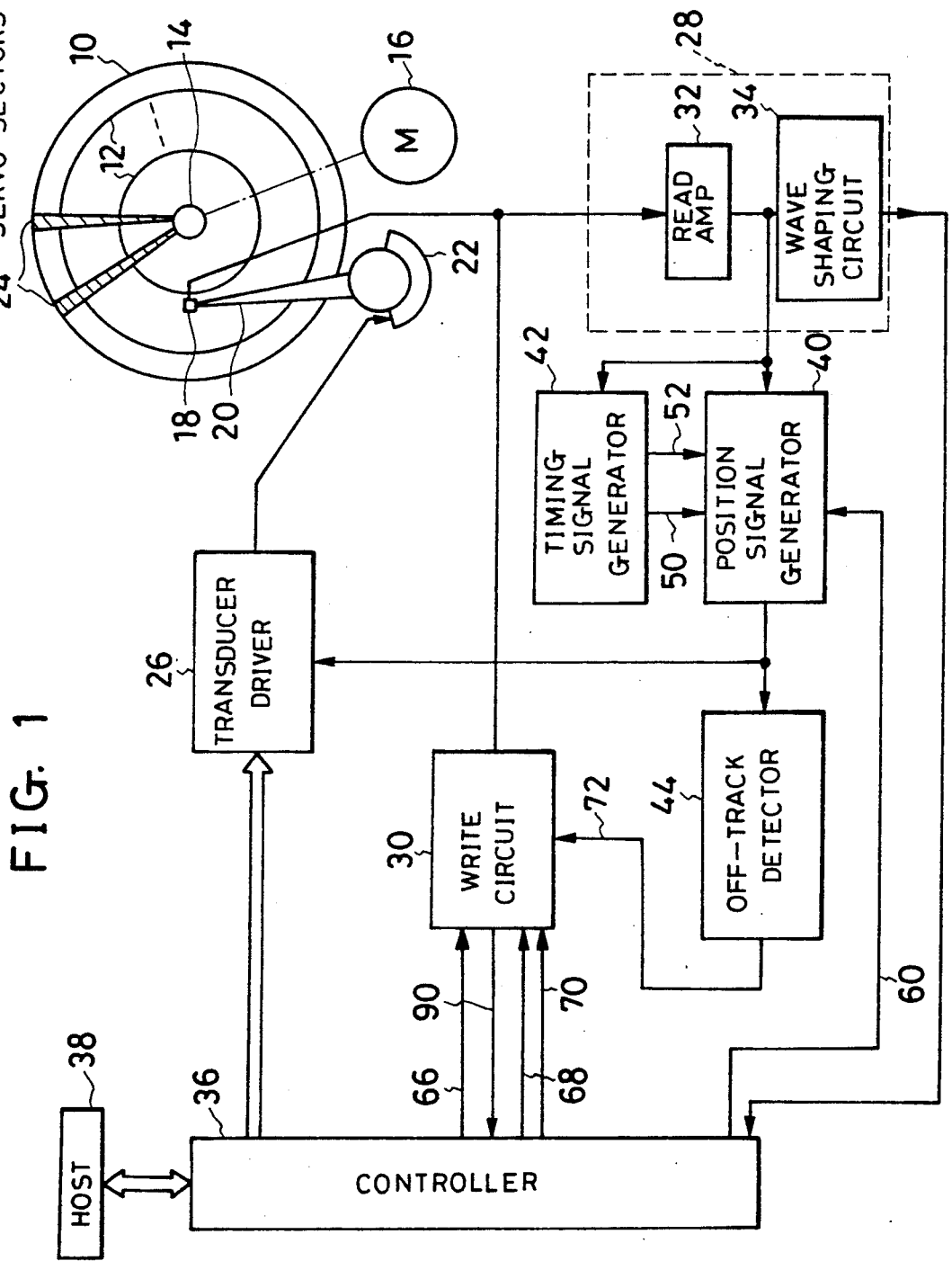
FIG. 1 is a block diagram of a data processing system incorporating the hard magnetic disk drive embodying the principles of our invention.

We will now describe our invention as embodied in a hard disk drive forming part of a data processing system shown diagrammatically in FIG. 1. The representative system is shown highly simplified, having but one magnetic disk 10. In practice, however, a stack of two or more such disks may be employed. We also assume for simplicity that the illustrated disk 10 is single-sided, with a multiplicity of concentric data tracks 12 on one side only. We have shown only the radially outmost and radially inmost ones of such tracks 12 for illustrative convenience. The disk 10 is mounted fast on a drive spindle 14 which is coupled, either directly or indirectly, to a disk drive motor 16.

Disposed opposite the data storage surface of the disk 10 is a transducer 18 which is gimbaled on the distal end of a carrier beam 20. The transducer carrier beam 20 is coupled to a positioning actuator herein shown as a voice coil motor 22. Driven by this motor, the transducer 18 is to travel across the data tracks 12 on the magnetic disk 10 and to be positioned on any selected one of these tracks.

As is conventional in the disk drive art, the transducer 18 is in contact with a predefined landing zone on the disk surface when the disk is out of rotation. The landing zone may be either radially inside or outside the data tracks 12. The transducer 18 slides over the landing zone when the disk is set into rotation. Then, as the disk picks up speed, the transducer rides upon an air cushion created by disk rotation and aerodynamically starts flying over the disk surface for reading or writing data thereon.

Figure 2:
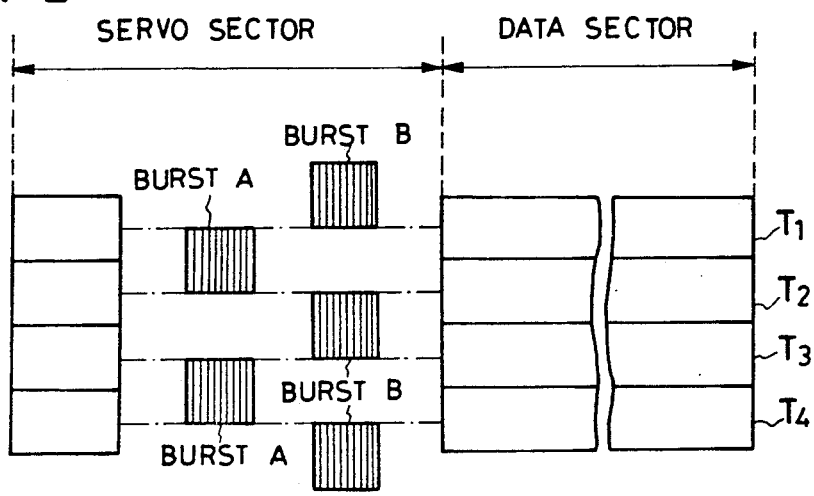
FIG. 2 is a schematic diagram of one servo sector and one adjacent data sector on the magnetic disk used in the data processing system of FIG. 1.

As is also well known in the art, the disk 10 has a plurality (e.g. sixteen) of servo sectors interleaved with as many data sectors. We have, however, indicated only two neighboring ones of the servo sectors by hatching and designated them 24 for illustrative convenience. As schematically depicted in FIG. 2, each servo sector of the disk 10 has servo bursts A and B prerecorded thereon for positional control of the transducer 5 with respect to the centerlines of the tracks. It will be seen that each of the tracks $T_1$–$T_4$, . . . has the servo bursts A and B disposed on the opposite sides of the track centerline. Further the servo bursts A and B are staggered radially of the disk 1, each extending between the centerlines of two adjacent tracks.

We understand that each data sector contains a data field and an identification field with intervening gaps. The data field is for the storage of user data. The identification field has prerecorded thereon the data representative of the identification number preassigned to that sector. As is well known, the transducer 18 reads the prerecorded data on the servo sectors and on the identification fields of the data sectors even during operation in the write mode.

With reference back to FIG. 1 a transducer driver circuit 26 is electrically connected to the voice coil motor 22 for driving the same for both tracking and seek controls. Electrically connected to the transducer 18, on the other hand, are a read circuit 28 and a write circuit 30. The read circuit 28 comprises an amplifier 32 for amplifying the output from the transducer 18, and a wave-shaping circuit 34 for shaping the amplified transducer output into discrete pulses representative of the read data. The read circuit 28 sends the read data pulses to a disk drive controller 36 which, as is well known, controls the disk drive under the direction of a host computer 38.

The read amplifier 32 is connected to both position signal generator circuit 40 and timing signal generator circuit 42, besides being connected to the wave-shaping circuit 34. The position signal generator circuit 40 generates a transducer position signal from those parts of the amplified transducer output which represent the servo bursts A and B on the servo sectors 24 of the disk 10. The transducer position signal represents the degree of possible lateral displacement of the transducer 18 from its position of centerline alignment with any of the data tracks 12 on the disk 10. This signal is given both to the transducer driver circuit 26 and to an off-track detector circuit 44.

Figure 3:
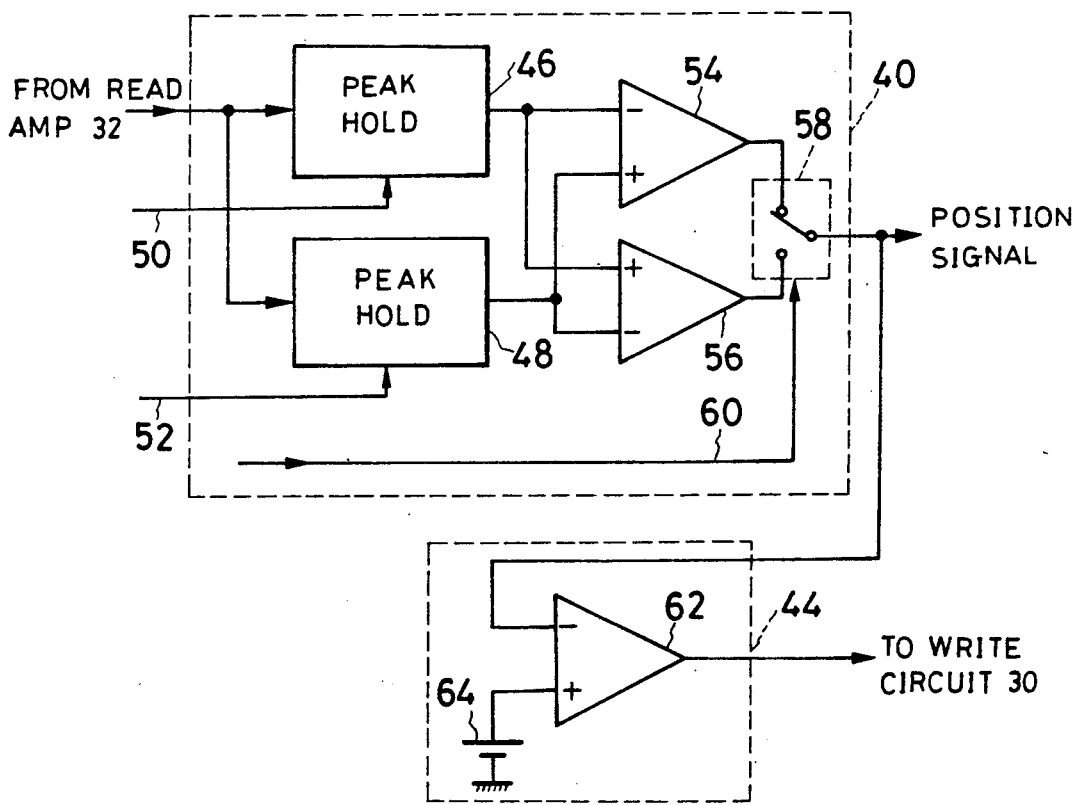
FIG. 3 is a block diagram of the position signal generator circuit and off-track detector circuit forming parts of the transducer position control system in the system of FIG. 1.

Reference is directed to FIG. 3 for a more detailed study of the position signal generator circuit 40 and the off-track detector circuit 44. Per se well known to the specialists, the position signal generator circuit 40 comprises two peak hold circuits 46 and 48, both having their inputs connected to the read amplifier 32. Timed by the timing signals supplied from the generator circuit 42 over lines 50 and 52, the peak hold circuits 46 and 48 derives the servo burst peaks from the amplified transducer output and hold the peaks.

The peak hold circuits 46 and 48 are connected one to each of two differential amplifiers 54 and 56 as shown. The differential amplifier 54 compares the outputs from the peak hold circuits 46 and 48 and produces a transducer position signal for the odd-numbered data tracks on the disk 10. Similarly, the other differential amplifier 56 produces a transducer position signal for the even-numbered data tracks on the disk 10. Each transducer position signal has a variable voltage value indicative of the displacement of the transducer 18 from the track centerline.

The outputs of the differential amplifiers 54 and 56 are both connected to an output selector switch 58. This switch is actuated by a switch control signal fed from the controller 36 over a line 60. The switch control signal is such that the switch 58 chooses the output from the first differential amplifier 54 when the transducer 18 is positioned on the odd-numbered tracks, and the output from the second differential amplifier 56 when the transducer is positioned on the even-numbered tracks. The transducer position signal thus formed by the generator circuit 40 is fed to both transducer driver circuit 26 and off-track detector circuit 44.

As shown also in FIG. 3, the off-track detector circuit 44 includes a comparator 62 having its two inputs connected to the position signal generator circuit 40 and to a reference voltage source 64. Thus the output (off-track signal) from the comparator 62 changes, indicating that the transducer 18 has gone off of the track centerline in either direction beyond predetermined limits, when the voltage of the tranducer position signal crosses the reference value.

The noted predetermined limits are such that, displaced beyond these limits, the transducer 18 can no longer write on the desired data track and may destroy the data on the neighboring tracks. We recommend that the reference voltage be equal to the magnitude of the position signal when the transducer 18 is displaced approximately one third of the track width.

As will be seen by referring once again to FIG. 1, the transducer driver circuit 26 has its inputs connected to both controller 36 and position signal generator circuit 40. The transducer driver circuit 26 can be per se of familiar construction designed to perform the two familiar functions. One is to cause movement of the transducer 18 from any departure track to any other destination track in response to the seek data from the controller 36. The other is to position the transducer 18 in centerline alignment with the destination track in response to the transducer position signal from the generator circuit 40.

Connected as aforesaid to the transducer 18, the write circuit 30 is additionally connected to the controller 36 for inputting write data over a line 66, a write gate signal over a line 68, and a sector number signal over a line 70. Further the write circuit 30 is connected to the off-track detector circuit 44 for inputting the off-track signal therefrom over a line 72.

As shown in detail in FIG. 4, the write circuit 30 conventionally includes a write signal generator circuit 74 for producing a write current representative of the write data supplied from the controller 36 over the line 66. We additionally provides a write control circuit 76 for connection to the write signal generator circuit 74 in order to modify its operation in accordance with our novel concepts.

The write control circuit 76 includes an AND gate 78 having one input connected to the write gate signal line 68, another input to the off-track signal line 72, and an output to the write signal generator circuit 74. The output from this AND gate 78 is therefore high when the write gate signal is high, indicating permission for the write data to be written on the disk, and, at the same time, when the off-track signal is also high, indicating the track centerline alignment of the transducer within the limits. Fed to the write signal generator circuit 74, the high output from the AND gate 78 closes a switch, not shown, to enable the circuit 74 to deliver to the transducer 18 a write current representative of the incoming write data.

The write control circuit 76 includes another AND gate 80 having one input connected to the write gate signal line 68, and another input to the off-track signal line 72 via a NOT circuit 82. The output of this second AND gate 80 is connected via a trigger circuit 84 to the set input S of a flip flop 86. The second AND gate 80 goes high when the write gate signal is high and at the same time, when the off-track signal is low, indicating that the transducer is off the desired track. The high output from the AND gate 80 sets the flip flop 86 via the trigger circuit 84.

So set, the flip flop 86 delivers a signal indicative of the fact that the transducer is off the track, from its Q output to an interrupt input INT of a microcomputer 88. This microcomputer may be factory preprogrammed to memorize, in response to the signal from the flip flop 86, the identification number of the sector where the transducer has gone off the track, and also to deliver that sector number to the controller 36 over a line 90 for rewriting. The microcomputer 88 has another output connected to the reset input R of the flip flop 86 via another trigger circuit 92. The flip flop 86 is to be reset by the microcomputer 88 preparatory to rewriting on the sector where the transducer has gone off the track.

The microcomputer 88 is connected via the noted sector number signal line 70 to the controller 36. The sector number signal is the one that indicates the identification numbers of the successive sectors being scanned by the transducer 18. The controller 36 obtains this information as the transducer 18 reads the sector numbers recorded on the identification fields of the data sectors. The microcomputer 88 has additional inputs connected directly to the off-track signal line 72 and to the write gate signal line 68.

OPERATION

When the data processing system of FIG. 1 is electrically powered on, the microcomputer 88 of the write control circuit 76 will deliver a reset signal to the flip flop 86.

Let us assume that the host computer 38 has delivered a write command to the controller 36, along with data representative of the destination track and destination sector to which the transducer 18 is to be moved. Then the transducer driver circuit 26 will actuate the voice coil motor 22 for accessing the transducer 18 to the destination sector of the destination track.

Then, in order for the write data on the line 66 to be written on the disk 10, the AND gate 78 of the write control circuit 76 must be enabled. The AND gate 78 is enabled as aforesaid when the write gate signal on the line 68 indicates permission for writing and, at the same time, when the off-track signal on the line 72 indicates that the transducer position on the track is within the limits. When these conditions are both met, the AND gate 78 will permit the write signal generator circuit 74 to deliver the required write current to the transducer 18. The write data will thus be written on the specified sector of the specified data track on the disk 10.

Possibly, the off-track signal on the line 72 may be low, indicating that the transducer 18 is not properly positioned on the destination track, while the write gate signal is high. The AND gate 78 will then inhibit the delivery of the write signal from its generator circuit 74 to the transducer 18. Therefore, even if the transducer is accidentally positioned on a track on either side of the destination track, the data that has been stored on that track will not be ruined by the writing of new data thereon.

The other AND gate 80 of the write control circuit 76 will be high when the off-track signal is low while the write gate signal is high. The flip flop 86 will then be set, and will remain so until reset by the microcomputer 88. The microcomputer 88 will respond to the high output from the flip flop 86 by writing on its internal memory the identification number of the sector on which the transducer has gone off the track. Then the microcomputer 88 will proceed to reset the flip flop 86.

Further the microcomputer 88 will signal the controller 36 over the line 90 to rewrite the same data on the sector where the transducer has gone off the track. Thus the write gate signal will go high when the transducer 18 restarts traveling over the sector in question with the revolution of the disk 10. Whether or not the transducer is still off the track on that sector will then be determined by the two AND gates 78 and 80. The AND gate 78 will go high if the transducer is on the track, permitting the delivery of the write current from the circuit 74 to the transducer. The desired data will thus be written on the sector.

If the transducer is still off the track, on the other hand, the other AND gate 80 will go high. Then the identification number of the sector will again be written on the microcomputer 88 to retry writing on the sector. The same procedure will be repeated a predetermined number of times (e.g. five). When the final retry proves unsuccessful, the microcomputer 88 will cause the controller 36 to send an error signal to the host computer 38, which will then respond by canceling the write command.

POSSIBLE MODIFICATIONS

Although we have shown and described our invention in very specific aspects thereof, we do not wish our invention to be limited by the exact details of the foregoing embodiment. The following, then, is a brief list of possible modifications or alterations of the illustrated embodiment that will suggest themselves to one skilled in the art without departure from the scope of our invention:

1. The write control circuit 76 of FIG. 4 could dispense with the AND gates 78 and 80 and flip flop 86, and the write gate signal line 68 and off-track signal line 72 could be connected directly to the microcomputer 88. This microcomputer might then be modified to determine the fact that the transducer had gone off the track during the high state of the write gate signal. Also, the write signal generator circuit 74 might be controlled by the microcomputer 88.

2. The write control circuit 76 could also dispense with only the flip flop 86 if its functions were built into the microcomputer 88.

3. The flip flop 86 could be reset shortly before the transducer restarts writing on the same sector, rather than immediately after the identification number of the sector where the transducer has gone off the track is written on the internal memory of the microcomputer 88.

4. The off-track detector circuit 44 and write control circuit 76 could be built as parts of the controller 36.

5. A direct current motor, linear motor, or any other suitable actuator could be employed in place of the voice-coil motor 22.

What we claim is:

1. A write control system for a data storage apparatus for use with a disk medium having a multiplicity of concentric data tracks, servo information being prerecorded on the disk medium, the write control system comprising:
   (a) transducer for reading the servo information from the disk medium and for writing data to the disk medium;
   (b) read circuit coupled to the transducer for processing the servo information read by the transducer from the disk medium;
   (c) write signal generator coupled to the transducer for supplying to the transducer a write signal indicative of data to be written to the disk medium;
   (d) transducer driver coupled to the transducer for controllably moving the transducer relative to the disk medium and for positioning the transducer along a centerline of a selected data track on the disk medium;
   (e) position signal generator coupled to the read circuit and the transducer driver for producing a transducer position signal from the servo information read from the disk medium by the transducer, the transducer position signal being indicative of a lateral displacement of the transducer with respect to the centerline of the selected data track on the disk medium on which the transducer is positioned for writing data;
   (f) off-track detector coupled to the position signal generator for determining whether the transducer is positioned within predetermined limits on the selected data track and for producing an off-track signal in response to determining that the transducer position is displaced beyond the predetermined limits.
   (g) gate means connected between the off-track detector and the write signal generator for preventing the write signal generator from supplying the write signal to the transducer when the transducer is found to be displaced from the selected data track beyond the predetermined limits; and
   (h) processor means connected to the off-track detector for storing the location on the disk medium where the transducer has been found to be displaced beyond the predetermined limits, and for producing a signal commanding the rewriting of data on the location.

* * * * *